Figure 1:
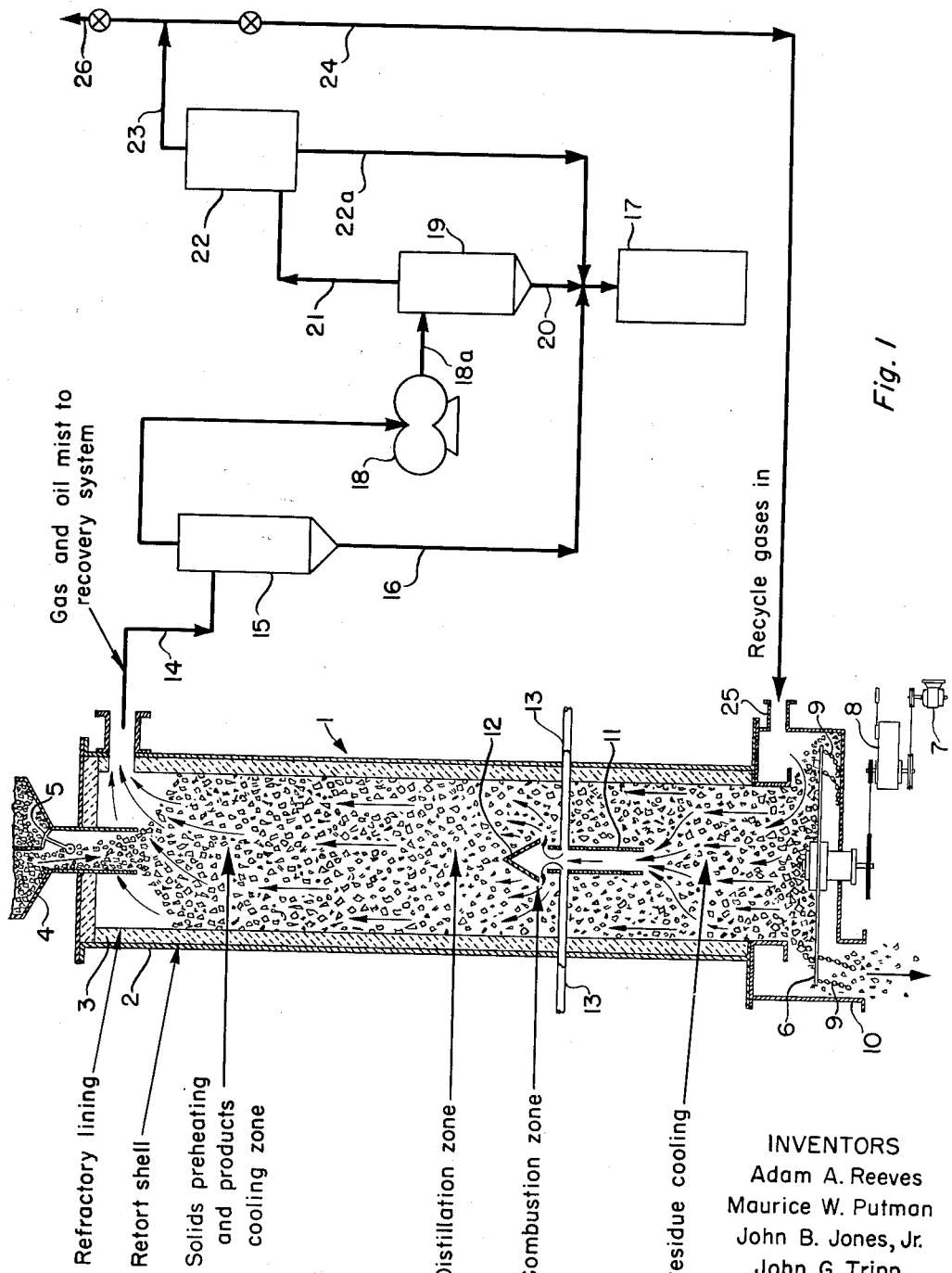

INVENTORS
Adam A. Reeves
Maurice W. Putman
John B. Jones, Jr.
John G. Tripp
BY Donald G. Welch
ATTORNEY July 31, 1956
A. A. REEVES ET AL
2,757,129
METHOD FOR THE DESTRUCTIVE DISTILLATION
OF HYDROCARBONACEOUS MATERIALS
Filed Oct. 3, 1951
6 Sheets-Sheet 3
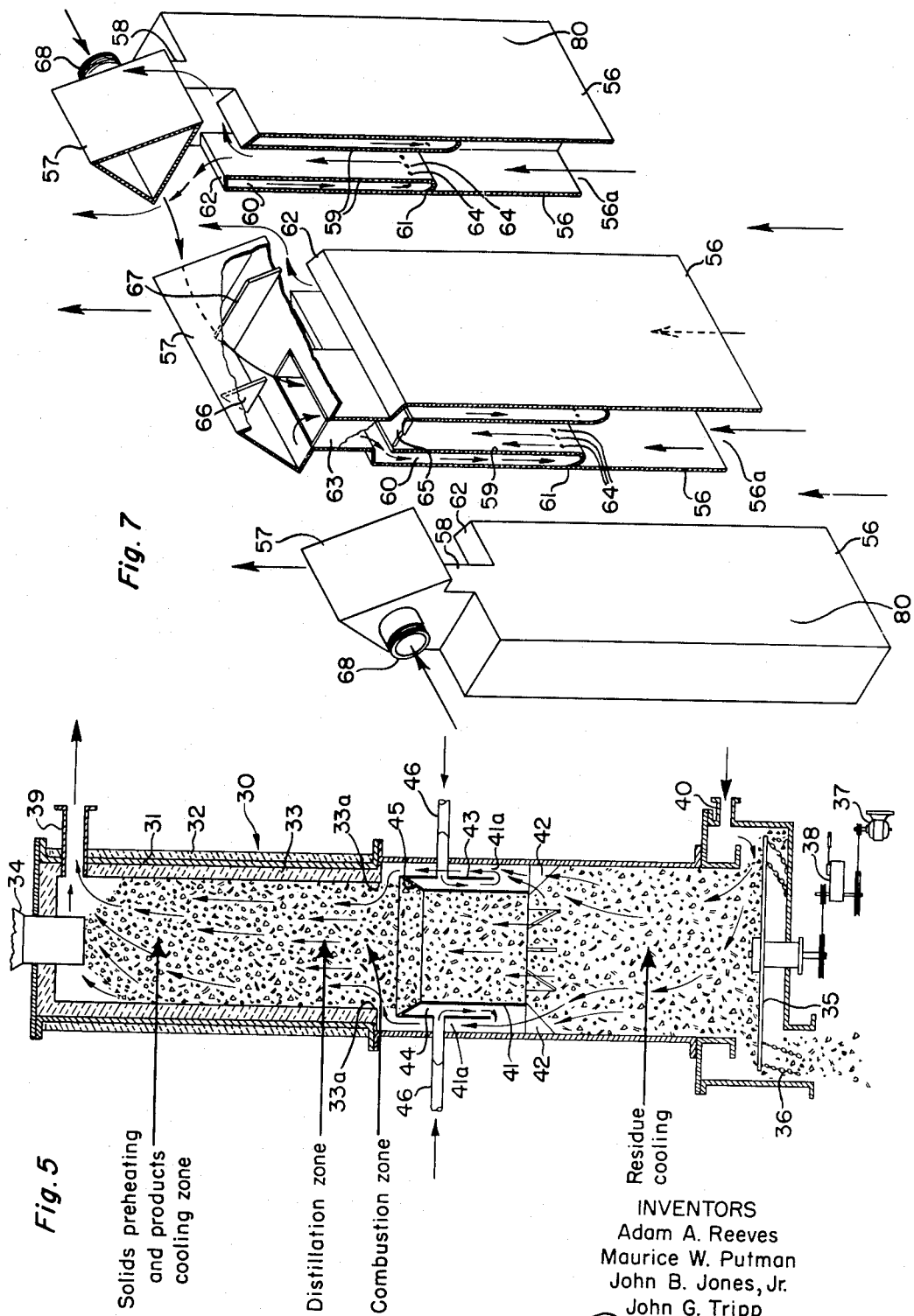
INVENTORS
Adam A. Reeves
Maurice W. Putman
John B. Jones, Jr.
John G. Tripp
BY Donald G. Welsh
ATTORNEY

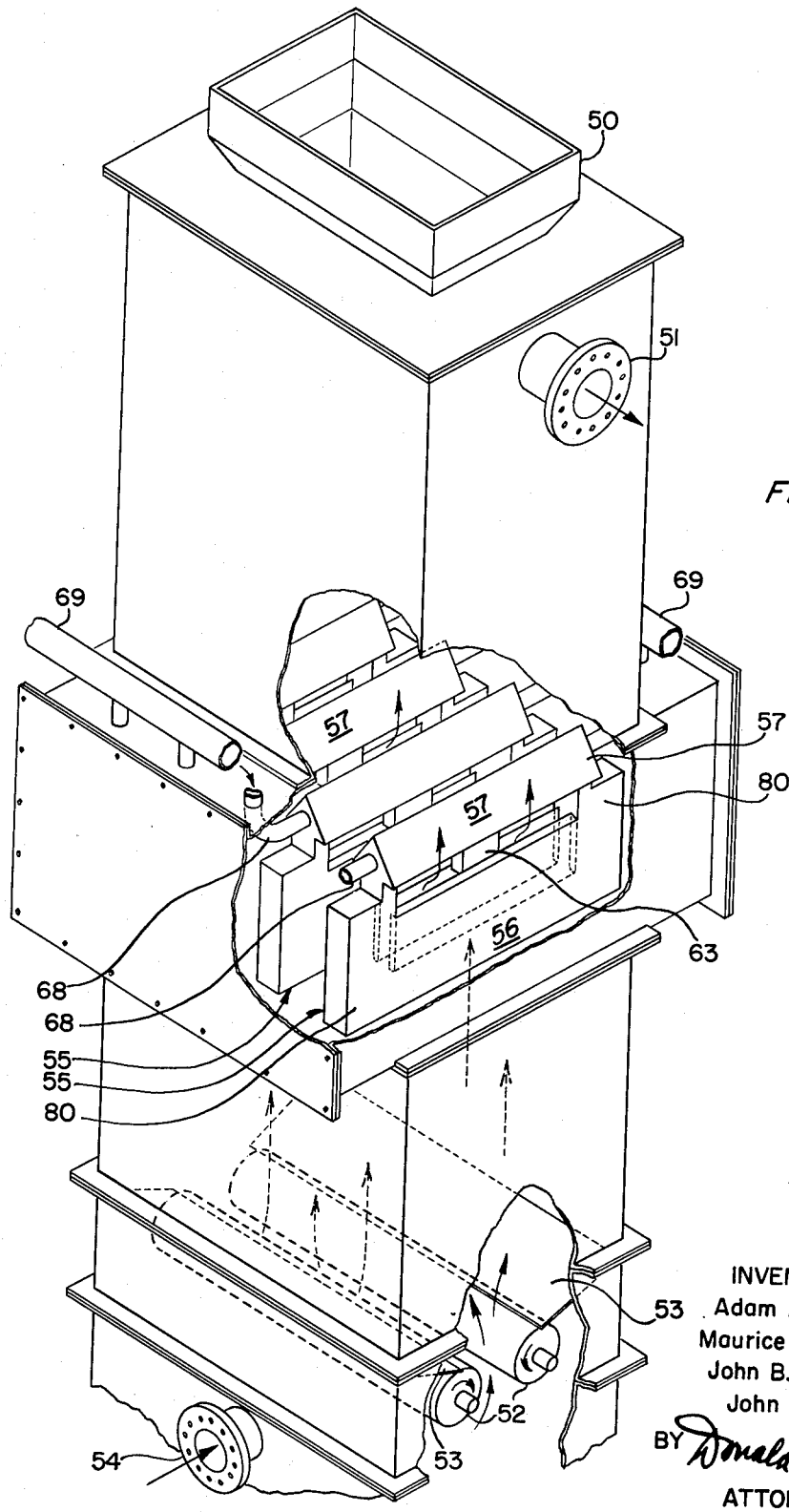

United States Patent Office 2,757,129
Patented July 31, 1956

2,757,129

METHOD FOR THE DESTRUCTIVE DISTILLATION OF HYDROCARBONACEOUS MATERIALS

Adam A. Reeves, Maurice W. Putman, and John B. Jones, Jr., Rifle, Colo., and John G. Tripp, Gaithersburg, Md., assignors to the United States of America as represented by the Secretary of the Interior Application October 3, 1951, Serial No. 249,604

12 Claims. (Cl. 202—6)

(Granted under Title 35, U. S. Code (1952), sec. 266)

The invention herein described and claimed may be manufactured and used by or for the Government of the United States of America for governmental purposes without the payment of royalties thereon or therefor.

This invention is generally related to the destructive distillation of solid hydrocarbonaceous materials and is particularly concerned with an improved process and apparatus for the destructive distillation of oil shale to produce useful liquid products.

In its fundamental aspects, the retorting or destructive distillation of oil shale and other solid hydrocarbonaceous materials is a relatively simple operation. Basically it involves only the steps of heating the solid material to the proper temperature and of recovering the liquid products evolved. However, in the development of this fundamentally simple operation into a process suitable for application on a large commercial scale, it has become apparent that the economy and efficiency of the process depends upon the proper choice among, and the proper combination of, a large number of possible operating conditions which are so inter-related that a change in a single one can alter the character of the entire process. Thus, for example, it is necessary to consider the various possible methods for physically moving the solid material through the vessel or vessels in which the retorting and auxiliary operations are carried out. The choice of a particular method cannot be based merely on mechanical considerations since the manner in which the solids move through the distillation zone and the other processing zones has a profound effect on the choice of the other operating conditions. Again, it is necessary to consider the many possible sources of heat that may be used, and the most advantageous manner of utilizing one or more of these sources to supply heat for the distillation step. In order for the retorting operation to be economically feasible, the process must be self-supporting as far as energy requirements are concerned and if possible, should derive all of its heating requirements from the gaseous and solid products of the distillation without consuming any of the more valuable liquid products. Further, the many possible methods of transferring heat to the solid material and of recovering heat from the gaseous and liquid distillation products, and from the solid distillation residue, must be considered. Each possible method of heat transfer must be considered not only in itself, but also in relation to the source, or sources, of heat to be employed, and in relation to the manner in which the solids move to and from and through the distillation and heat recovery zones.

In order to achieve a retorting process which is economical and efficient and suited for application on a large scale, these and other important operating conditions must be so chosen and related to one another that, first of all, the overall process is adapted to continuous as distinguished from batch operation. Further, the process should permit high unit throughput and be amenable to the design of processing units of large capacity. The process should likewise have a high thermal efficiency. This is important because large quantities of solid material must be heated to a relatively high temperature to recover a comparatively small quantity of liquid products. If possible, the process should be capable of operation with the use of little or no cooling water. This factor is of special importance in relation to oil shale retorting since most of our domestic supplies of oil shale are located in relatively arid portions of the country, such as in the States of Colorado, Wyoming, and Utah. In addition of course, the process should be capable of recovering the maximum amount of potentially available liquid products. Finally, all of these ends should be achieved in a simple manner without the use of elaborate mechanical devices.

In an effort to achieve these ends, literally hundreds of retorting processes have been proposed, each of which offers a somewhat different choice and combination of the many possible operating conditions. Many of these prior processes possess in a fairly high degree one or more of the above desiderata, but most, in one important respect at least, seriously fail to fulfill the requirements of an ideal retorting process.

The object of the present invention is to provide a process for the destructive distillation of oil shale and other hydrocarbonaceous materials which possesses to a high degree all of the important requirements necessary for overall economical and efficient operation. Thus, the invention has for its object the provision of a retorting process which is continuous in operation, which is capable of high unit throughput in units of large capacity, which is capable of operation with high thermal efficiency and with the use of little or no cooling water, which permits the recovery of a maximum amount of the potential yield of liquid products, and which accomplishes these ends in a simple manner in a unit of simple design.

A further object of the invention is to provide a retorting vessel which is particularly adapted to carry out the retorting process in its preferred form.

In general terms, the improved retorting process envisioned by the present invention involves the steps of passing the solid hydrocarbonaceous material in particulate form downwardly in a continuous, substantially vertical column successively through a preheating zone, a distillation zone, a combustion zone, and a residue cooling zone. The solid residue from the combustion zone is removed in a cool condition at the bottom of the column while the distillation and combustion products, including a noncondensible gas, relatively lean in combustibles are removed from the top of the column. At least a portion of this noncondensible gas, in a cool condition, is recycled to the bottom of the column and passed upwardly through the downwardly moving residue from the combustion zone, thus cooling the hot residue and itself becoming heated. No oxygen is present in this portion of the column, and thus no combustion can take place; sensible heat is merely exchanged in countercurrent fashion between the upwardly rising gas and the downwardly moving combustion zone residue.

In the upper portion of the residue cooling zone, at least a portion of the recycled gas which is now in relatively hot condition, is disengaged from the column of solid material and then mixed with a sufficient amount of an oxygen-containing gas, preferably air, to form a combustible mixture therewith. This mixture is then passed back into the column of material at a point above the residue cooling zone, thereby establishing a fixed zone of combustion within the column between the residue cooling zone and the distillation zone.

The hot gases produced in the combustion zone pass upwardly through the column and quickly give up their heat to the downwardly moving material, thereby establishing a relatively narrow zone of distillation immediately above the combustion zone. The gaseous products of distillation and combustion, still relatively hot, pass upwardly through the column in contact with the downwardly moving raw hydrocarbonaceous material, whereby the combustion and distillation products rapidly become cooled and the hydrocarbonaceous solids become heated.

In accordance with the preferred embodiment of the invention, disengagement of the preheated recycle gases from the residue cooling zone is accomplished by maintaining one or more vertically-extending solids-free channels in the upper portion of the residue cooling zone and immediately adjacent the downwardly moving column of solid material. This channel (or channels) communicates at its upper and lower extremities with the column of downwardly flowing solids, the upper extremity of the channel being suitably shielded to prevent the ingress of solid material. With this arrangement, at least a portion of the hot lean gas flowing upwardly through the residue cooling zone becomes disengaged from the column of material (by following the path of least resistance) and passes into the lower portion of the channel, rising upwardly therethrough out of contact with the solid material. The gas which does not flow into the channel flows upwardly through the column of material parallel to the gas flowing in the channel. Oxygen containing gas, most conveniently air, is injected into the channel and mixes with the disengaged gas rising therein. This mixture then passes out of the upper portion of the channel into the column of solid material. In this fashion, a combustion zone is established in the vicinity of the upper extremity of the channel.

According to a particularly preferred embodiment of the invention, the vertical channel (or channels) is disposed directly within the column such that it is substantially entirely surrounded by the downwardly moving solid material. Generally speaking, with this arrangement, better control of the retorting conditions, particularly with respect to uniformity of bed temperature can be maintained, and as a consequence higher yields of liquid product are generally obtainable.

Figure 4:
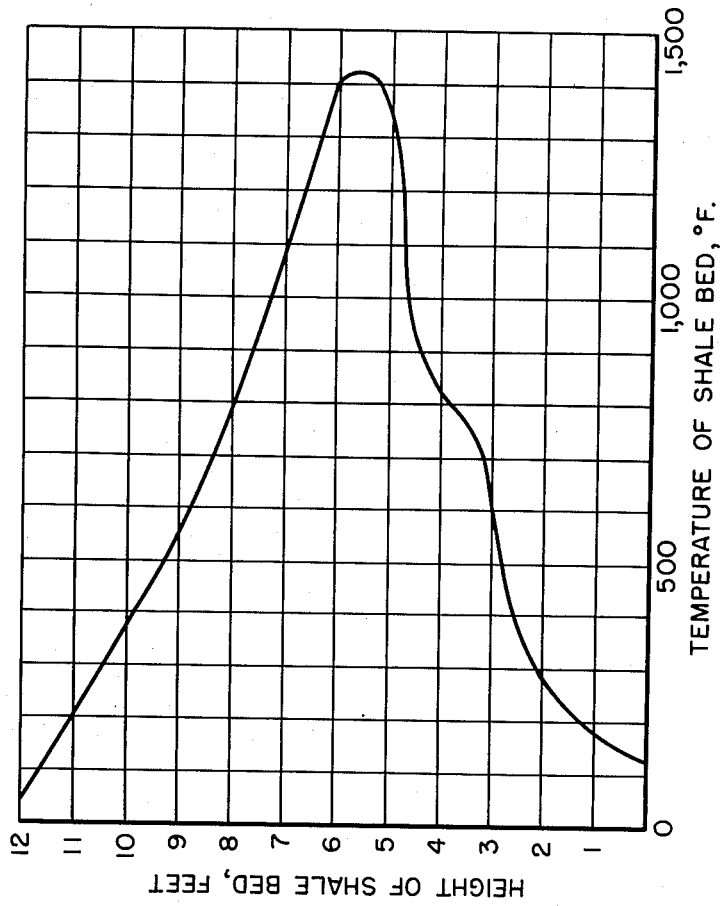
Figure 4:
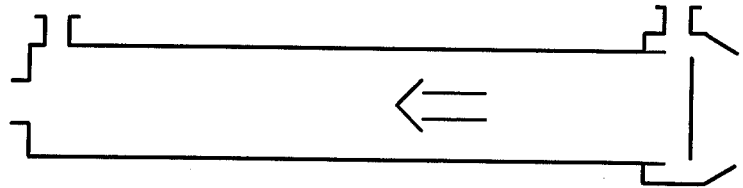
Figure 3:
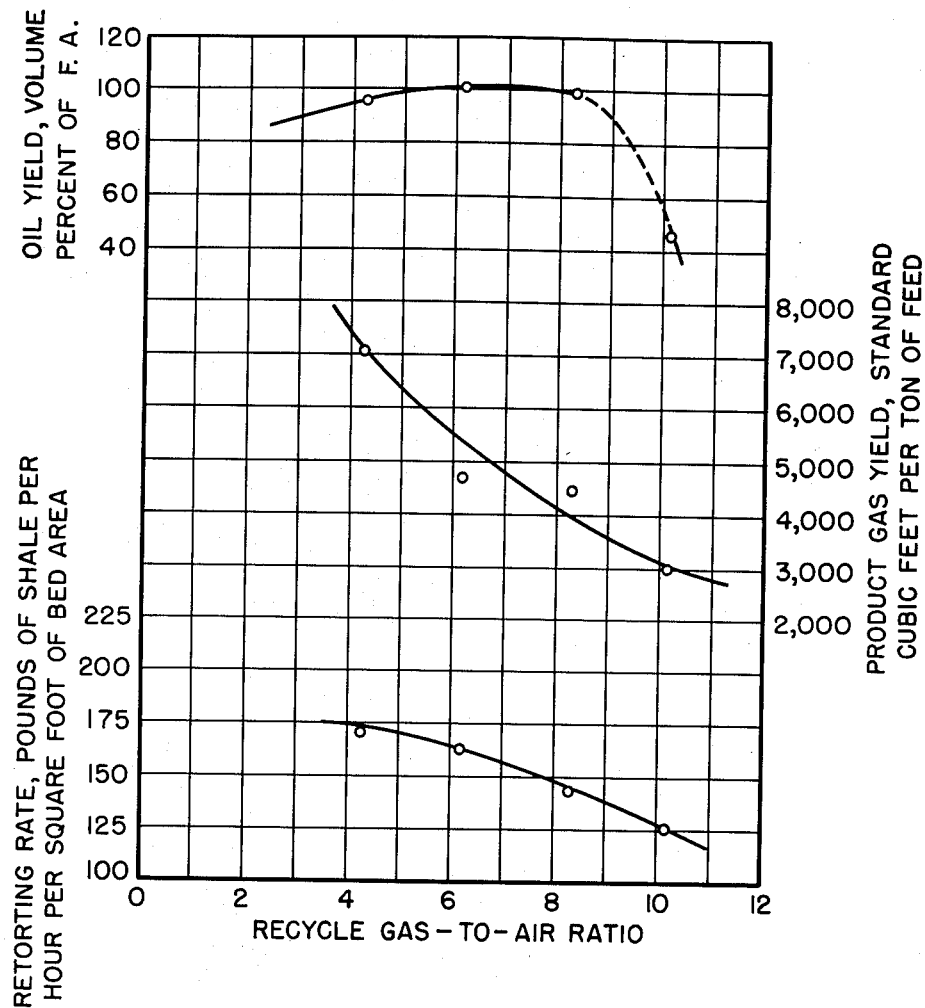
Figure 2:
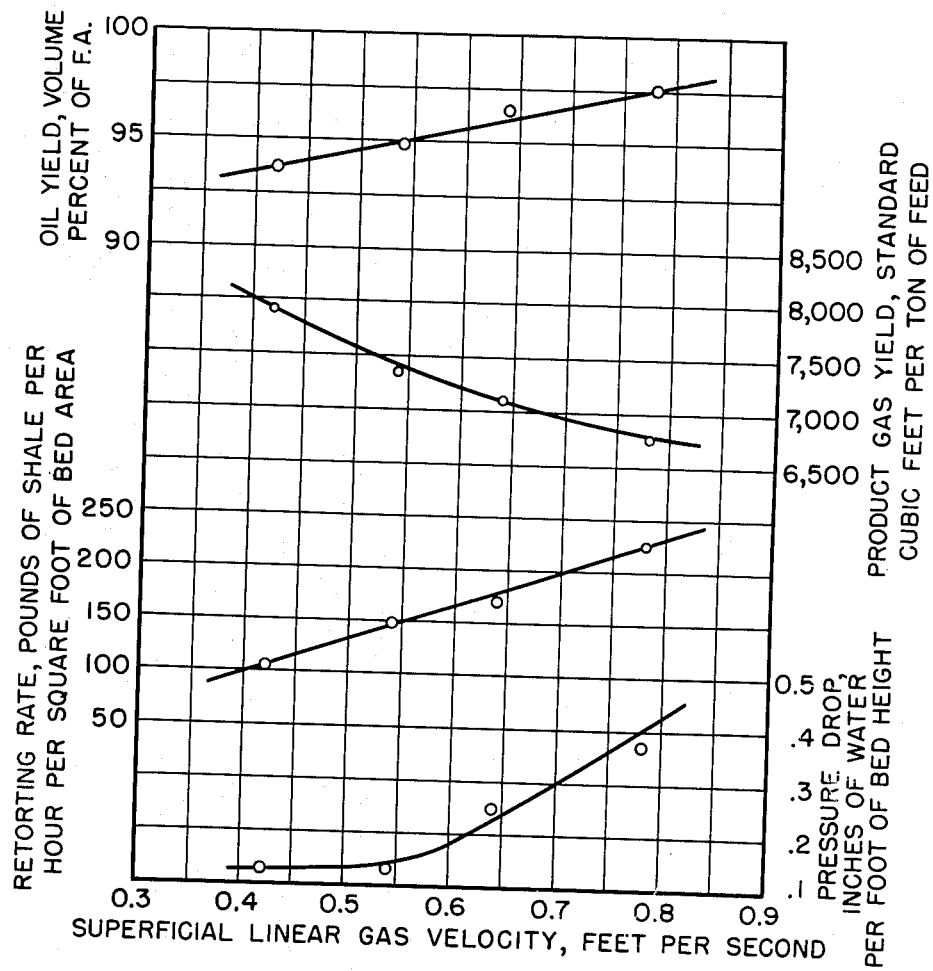

For a better understanding of the invention reference is now made to the accompanying drawings, wherein:

Fig. 1 is a semidiagrammatic illustration of a retort suitable for carrying out a preferred embodiment of the process of the invention, together with a schematic illustration of the product recovery and gas circulation systems serving the retorting vessel; and, Fig. 2 is a diagram showing the effect of one of the process variables on the operating conditions; and, Fig. 3 is a diagram showing the effect of another of the process variables on the operating conditions; and, Fig. 4 is a diagram showing a representative bed-temperature profile obtained by operation in accordance with the invention; and, Fig. 5 is a semidiagrammatic illustration of another type of retort suitable for carrying out the process of the invention; and, Fig. 6 is an isometric illustration of a retorting vessel suitable for carrying out the process of the invention on a large scale; and, Fig. 7 is an isometric illustration in detail of one of the gas-air mixing devices used in connection with the retort shown in Fig. 6.

Referring now particularly to Fig. 1, reference numeral 1 refers generally to a cylindrical, upright retorting vessel comprising a metal shell 2 suitably insulated with a refractory lining 3. A charge hopper 4 is disposed at the top of the retort. The charge hopper may be of any suitable construction, but should be adapted to maintain a continuous feed of solid material into the top of the retort and at the same time maintain a gas-tight seal to prevent the escape of gases and vapors from the retort through the charging mechanism. As shown in the drawing, the charge hopper is divided into two compartments, one of which is recharged while the other is delivering its contents to the retort. A sliding valve 5 is provided to simultaneously open one compartment to the retort and to close off the other for recharging.

At the bottom of the retort, a discharging mechanism is provided consisting of a turn-table 6 driven by a variable speed motor 7 through a gear box 8. As will be more fully described subsequently, the rate of shale discharge is automatically controlled by a temperature control instrument located near the top of the shale bed which regulates the speed of the rotating turn-table 6. With the help of drag chains 9, the turn-table 6 discharges residual solids into an ash-leg 10 for disposal in any desired fashion. Ash-leg 10 is equipped with a suitable gas seal (not shown).

At the vertical axis of the retorting vessel, at an intermediate level therein, an open ended cylindrical tube 11 is provided. Directly above the upper end of the tube 11 is positioned a hollow, cone-shaped deflector 12. As can be seen, the base of the cone-shaped deflector 12 is spaced from the upper end of the tube 11 and is somewhat larger in diameter so as to effectively prevent solid material flowing downwardly through the retort from entering the tube. A plurality of gas conduits 13 are provided for admitting an oxygen-containing gas, such as air, into the upper portion of the tube 11 as shown in the drawing.

The conical deflector 12 and the tube 11 may be supported within the retort in any suitable manner. The tube 11, for example, may be supported entirely by conduits 13 which are in turn supported by the walls of the retort as shown. The deflector 12 may be connected by an open web to the upper portion of the tube 11 or if desired may be supported directly from the walls of the retort.

Serving this retorting vessel, a product recovery and gas circulation system is provided. This system, which is shown schematically, comprises centrifugal separators 15 and 19, a positive displacement blower 18, an oil receiver 17, and an electrostatic mist precipitator 22, together with connecting conduits.

The operation of the retort and its auxiliary system as shown in Fig. 1 will now be described with particular reference to the retorting of oil shale and in accordance with a preferred embodiment of the invention. It is to be understood of course, that with or without modification, the process described may be applied to the destructive distillation of other hydrocarbonaceous solids, such as coal, lignite, peat, wood, etc., and that many variations are possible within the scope of the invention.

Oil shale crushed to a suitable particle size is introduced into the top of the retort by means of hopper 4 and continuously passed downwardly through the retort in an uninterrupted column. The incoming oil shale from hopper 4 is at room temperature. The shale particle size can vary within relatively wide limits both as to maximum and minimum particle size and particle size distribution, depending on the size of the retort and the operating conditions. For large scale retorts relatively coarse shale, crushed and screened to a particle size as large as −5 inch may be employed, although a maximum particle size of about −3½ inch will generally be found more satisfactory. In some cases, it will be found desirable to eliminate some of the fines (particles smaller than about 6 mesh) to prevent excessive pressure drop in the retort and excessive carry-over of fines in the product stream.

The shale moves downwardly through the retort by gravity as a bed of freely moving particles and passes successively through a solids-preheating and product-cooling zone, a distillation zone, a combustion zone, and a residue cooling zone. The products of combustion and of distillation pass out of the top of the retort by line 14 and are conducted to the product recovery system. According to the preferred manner of operation, the combustion and distillation products are withdrawn from the retort at a relatively low temperature, for example 130° to 300° F. This low product stream exit temperature is made possible by maintaining a shale bed of suitable depth over the combustion zone, so that on passing countercurrently through the incoming cold shale, the product stream gives up substantially all its sensible heat to the shale. When product stream exit temperatures of 130° to 300° F. are employed substantially all the oil vapors in the product stream have reached their dew point, and under these conditions, these vapors condense as a fine mist before leaving the retort. This mist of fine oil droplets, entrained in the noncondensible product gases, is swept out of the retort through line 14. If the proper retorting conditions are observed, the oil mist will be sufficiently stable that it is not agglomerated in the retort (with resulting refluxing of the oil in the retort) and yet not so stable as to present recovery problems in the subsequent liquid recovery system.

The entrained mist is conducted to the first centrifugal separator 15 where the larger liquid mist droplets are removed from the product stream. The oil recovered in separator 15 is conducted to oil receiver 17 by line 16. The product stream, stripped of the larger mist droplets is repressurized by a positive displacement gas blower 18. The action of the blower causes further agglomeration of the oil mist, and the agglomerated oil particles are then separated from the gas stream by a second centrifugal separator 19 located in the blower discharge line 18a. The oil recovered here is led to storage by line 20, while the gas stream, still containing a small amount of fine oil mist, is conducted by line 21 to an electrostatic precipitator 22 to recover any residual oil which is led to storage by line 22a.

A portion of the clean gas stream flowing by line 23 from the electrostatic precipitator 22 is withdrawn to be recycled to the retort by line 24 while a portion is vented from the system by line 26. The gas stream recycled to the retort by line 24 consists essentially of the flue gases resulting from combustion within the retort enriched by noncondensible hydrocarbon gases produced by thermal decomposition of the kerogenous material in the shale. As used in the specification and in the claims, the term "noncondensible gas" refers to gases which fail to condense to liquids at atmospheric temperatures and under ordinary pressures, including the light hydrocarbon gases (such as methane, ethane, propane, ethylene, propylene, etc.) produced during the destructive distillation of the hydrocarbonaceous material, and the flue gases resulting from combustion including carbon dioxide, carbon monoxide, and nitrogen. The recycle gas stream will ordinarily be lean in combustibles since it will be rather highly diluted with combustion products, with carbon dioxide resulting from decomposition of the mineral carbonates in the shale, and with nitrogen when air is employed to support combustion within the retort. Typically, in the case of oil shale the product gas stream will contain from 6% to 25% combustibles and have a heating value of 40 to 160 B. t. u./s. c. f. depending upon the richness of the shale and the operating conditions.

This lean recycle gas, which is at a relatively low temperature (for example, 120° to 160° F.) is introduced into the bottom of the retort by line 25 and flows upwardly through the downwardly flowing residue from the combustion zone. In this portion of the retort, herein termed the residue cooling zone, direct heat exchange is effected between the cold recycle gas and the hot residue; the cold recycle gas is preheated by recovering sensible heat from the hot shale which in turn is cooled and leaves the retort at a temperature approximately that of the incoming cold recycle gas.

As the preheated recycle gas reaches the upper portion of the residue cooling zone a substantial portion of this gas, following the path of lesser resistance provided by the tube 11, becomes disengaged from the column of shale and passes into the lower portion of the tube, as indicated by the arrows in the drawing. The remainder of the recycle gas flows upwardly through the column of shale in the annulus between the tube 11 and the walls of the retort. The ratio of the amount of gas which flows through the channel provided by the tube 11 to the amount which flows through the shale bed depends upon the geometry of the retort, being related chiefly to the ratio of the cross-sectional areas of the tube 11 and the retort vessel.

Depending upon the operating conditions, such as the combustion zone temperature, volume of recycle gas per ton of shale, etc., the recycle gas typically attains a temperature of from 500° to 1000° F. before entering the lower portion of the tube 11. At these temperatures the recycle gas will burn readily although it is ordinarily too lean in combustibles to burn without preheat.

An oxygen-containing gas, preferably air, preheated if desired, is injected into the upper portion of the tube 11 by lines 13. The oxygen-containing gas is mixed with the preheated recycle gases rising through the tube and this mixture then passes out of the upper portion of the tube, is deflected downwardly and outwardly by the hollow, cone-shaped deflector 12, and is distributed in a uniform manner throughout the cross-section of the retort.

The ratio if recycle gas admitted at the bottom of the retort to the air admitted into the mixing tube is an important variable since it determines other process variables such as the combustion zone temperature. While the recycle gas:air ratio may vary within relatively wide limits, in general an excess of air should be avoided since this leads to high combustion zone temperatures which in turn leads to the danger of shale clinkering (which would render the process unoperable) and excessive mineral carbonate decomposition (which would absorb large quantities of heat). A deficiency of air leads to undesirably low combustion zone temperatures resulting in failure to fully retort the shale, causing lower yields and decreased throughput. Generally speaking, in the case of oil shale, under normal operating conditions, and employing the ordinary types of shale, recycle gas to air ratios between about 2.5 and 8 have been found to give the most satisfactory results. Using these ratios, moderate combustion zone temperatures, between about 1300° and 1700° F. are obtained. These conditions, namely recycle gas:air ratios between about 2.5 and 8 and combustion zone temperatures between 1300° and 1700° F. have been found to give the most satisfactory results when the product stream is withdrawn from the top of the retort at a temperature below the dew point of the oil vapors it contains. Under these conditions, the oil mist which forms within the retort is sufficiently stable so it does not agglomerate in the retort, but is not so stable as to present recovery problems in the subsequent oil recovery system.

If desired however, recycle gas:air ratios other than these may be employed, and similarly, combustion zone temperatures other than those in the above stated range may be used. Generally, the combustion zone temperature must be at least 900° F. in order to retort the shale at an appreciable rate, and should not exceed the temperature at which the shale begins to clinker.

Combustion of the recycle gas-air mixture takes place in the vicinity of the upper extremity of the tube 11, and may take place partly in the upper portion of the tube and partly in the shale bed or, more desirably, chiefly within the shale bed. Whether combustion of the gases is initiated within the mixing tube 11, or takes place almost entirely within the shale bed depends upon the flow rate of the gases in the tube 11. The flow rate in turn depends upon the geometry of the system (for example, the cross-section of the tube 21 in relation to the cross-section of the retort) and upon the amount of air and recycle gases entering the system. If the velocity of the gases flowing in the tube 11 is low enough, combustion may be initiated within the tube, and may even take place to a large extent in the upper portion of the tube. Preferably however, conditions are chosen so that combustion will take place chiefly or almost entirely throughout the cross-secton of the tube 11 in relation to the cross- the shale bed is to be preferred since, for one reason, the combustion within the tube would give rise to severe design problems connected with the construction of a tube able to withstand combustion temperatures.

The heat developed in the combustion zone is usually derived both from burning the lean recycle gases and from burning some of the organic residue remaining on the shale descending from the distillation zone. This organic residue is chiefly carbon in a reactive state which will burn very readily. It is difficult to determine what proportion of the heat is supplied by burning recycle gas and what proportion is supplied by burning organic residue, but indications are that when combustion takes place chiefly within the shale bed, a substantial portion is contributed by burning this organic residue. When combustion takes place to a large extent within the mixing tube, it is likely that a smaller proportion of the heat is supplied by burning organic residue inasmuch as the gas mixture flowing from the top of the tube into the column contains a smaller concentration of oxygen.

By operation in the manner described above, it is possible to definitely fix, at any desired level, the location of the combustion zone within the retort, and to secure a rapid and uniform release of heat within the shale bed at the level chosen. These conditions are of the greatest importance to the efficiency of the process and have hitherto been largely unattainable in a continuous internal combustion retorting operation.

According to the invention, the position of the combustion zone depends upon the point at which the recycle gas-air mixture flows into the shale bed. In the embodiment shown in Fig. 1 this point is determined by the location of the recycle gas-air mixing tube; the location of the combustion zone may be changed at will by changing the location of this tube. Regardless of the other process variables, such as rate of shale throughput, superficial gas velocity, combustion zone temperature, etc., it is impossible for combustion to take place below the point of air admission, since below this point there is no oxygen to support combustion. Similarly, because the preheated recycle gas-air mixture burns very rapidly, resulting in rapid consumption of the oxygen content of the air, combustion can only occur a short distance above the point at which the recycle-gas-air-mixture flows into the shale bed.

Ability to fix the position of the combustion zone at will makes it possible to locate the combustion zone in an intermediate section of the retort, and to accurately adjust and maintain the depth of shale bed above and below the combustion zone. This in turn makes it possible to accurately adjust and maintain the exit temperature of the product stream and of the shale residue stream at constant, low temperatures, thereby insuring the thermal efficiency of the process, and what is extremely important in the case of oil shale retorting, eliminating the use of cooling water to condense the oil vapors in the product stream.

Uniformity of bed temperature in the combustion zone (and consequently uniformity of bed temperature in the distillation zone) is very probably due at least in part, to the dilution of the air with a considerable volume of lean, recycle gases before admission into the shale bed. The concentration of oxygen in contact with the hot, reactive carbonaceous residue on the shale at the point of admission to the shale bed is thereby reduced, allowing combustion to take place evenly in the bed instead of in localized "hot spots." Other factors, such as the rapid expansion of the recycle gas-air mixture accompanying its rapid combustion, very probably also contribute to the rapid and uniform release of heat within the shale bed.

It is to be emphasized at this point that entirely different results are obtained when air alone, without premixing with disengaged preheated recycle gas, is introduced into the shale column at an intermediate level therein. Operation in this manner is extremely difficult because of the resulting unavoidably high combustion zone temperatures and the uneven bed temperatures, caused by local overheating of the air stream at the point or points of admission of the air stream. High combustion zone temperatures and uneven bed temperatures give rise to clinkering of the shale which impedes or entirely prevents the flow of the shale bed through the retort, and also cause unfavorable conditions in the distillation zone, leading to refluxing of the oil products in the shale bed and other undesirable conditions, and in general, a lack of control over the retorting process.

Continuing to follow the gas and solids flow within the retort, the hot gas from the combustion zone rises counter-currently to the descending shale thus effecting direct solids-to-gas heat exchange. The hot gases give up their heat to the shale rapidly bringing the shale to distillation temperatures, causing decomposition of the organic material therein, and evolution of oil vapors and noncondensible hydrocarbon gases. These combustion and distillation products continue to rise counter-currently to the incoming cold shale and thus are cooled to a low temperature before they are withdrawn by line 14 from the top of the retort.

Automatic control of the operation of the process is relatively simple. According to one convenient method, the ratio of recycle gas to air is held constant, while the rate of solids flow through the retort is controlled by a temperature responsive instrument located in the bed of solids at the top of the retort. This instrument is adapted to regulate the speed of the discharge mechanism at the bottom of the retort (the speed of rotation of the turntable 6 in the embodiment shown in Fig. 1) in such a manner as to maintain a constant temperature in the bed of solids at the top of the retort. It is to be understood of course, that other methods of control are possible.

The following runs illustrate the performance of a retorting process operated substantially in the manner described above in the retorting of a Colorado Green River oil shale, mined in the vicinity of Rifle, Colorado. The retorting vessel and auxiliary equipment were substantially the same as shown in Fig. 1. The vessel proper was 2½ feet in diameter, lined with 5 inches of insulating refractory. Its overall height was about 13 feet while the effective depth of the shale bed was 12'-8". The tube 11 was three inches in diameter and about 18" long and was disposed within the shale bed with its bottom opening about three feet from the bottom of the shale bed.

In the first eight runs the shale was crushed to a nominal particle size of +½ to —1 inch and a representative sample thereof had the following properties:

| | |
|---|---|
| Oil by Fischer assay,[1] gal./ton | 20.9 |
| Oil by Fischer assay, wt. percent | 8.0 |
| Gravity of Fischer assay oil, ° A. P. I. at 60° F | 23.0 |
| Water by Fischer assay, wt. percent | 1.6 |
| Mineral $CO_2$, wt. percent | 17.1 |
| Ignition loss, wt. percent | 30.0 |
| Ash, wt. percent | 70.0 |

In run 9 the shale feed was a blend of two different types of shale, crushed to a particle size of +¼ to —1 inch. A representative sample of the blend had the following properties:

| | |
|---|---|
| Oil by Fischer assay,[1] gal./ton | 24.1 |
| Oil by Fischer assay, wt. percent | 9.2 |
| Gravity of Fischer assay oil, ° A. P. I. at 60° F | 23.0 |
| Water by Fischer assay, wt. percent | 1.0 |
| Mineral $CO_2$, wt. percent | 20.00 |
| Ignition loss, wt. percent | 34.12 |
| Ash, wt. percent | 65.88 |

[1] According to the method described in: U. S. Bureau of Mines Report of Investigations—No. 4477—Method of Assaying Oil Shale by a Modified Fischer Retort, by Stanfield, K. E., and Frost, I. C.

Table 1.—Gas combustion retort data summary retorting conditions and yields

| Run No | 1 | 2 | 3 | 4 | 5 | 6 | 7 | 8 | 9 |
|---|---|---|---|---|---|---|---|---|---|
| Length of test, hrs | 20 | 24 | 24 | 24 | 24 | 24 | 36 | 24 | 223 |
| Shale charge rate, tons/day | 3.33 | 4.30 | 4.48 | 5.65 | 2.85 | 3.89 | 5.89 | 3.77 | 6.03 |
| Raw shale assay, gal./ton | 20.9 | 20.9 | 20.2 | 19.7 | 20.6 | 20.2 | 20.7 | 21.1 | 24.0 |
| Shale particle size, in | +½–1 | +½–1 | +½–1 | +½–1 | +½–1 | +½–1 | +½–1 | +½–1 | +¼–1 |
| Retorting conditions: | | | | | | | | | |
|   Shale rate, lb./hr. ft.² of bed area | 127 | 164 | 171 | 215 | 109 | 148 | 225 | 144 | 230 |
|   Recycle gas air ratio | 11.6 | 6.2 | 4.3 | 2.8 | 4.3 | 4.4 | 4.2 | 8.3 | 4.8 |
|   Air requirements, s. c. f./ton shale | 2,380 | 3,320 | 4,560 | 5,560 | 4,900 | 4,220 | 4,280 | 2,870 | 3,760 |
|   Vol. of gas and air in s. c. f./ton shale | 30,020 | 23,920 | 24,270 | 21,060 | 25,760 | 22,870 | 22,280 | 26,740 | 21,970 |
|   Gas in velocity, ft./sec.[1] | .46 | .46 | .46 | .46 | .31 | .38 | .55 | .46 | |
|   Gas out velocity, ft./sec.[1] | .54 | .58 | .64 | .71 | .42 | .54 | .78 | .57 | 0.8 |
|   Pressure drop, in. H₂O/ft. bed height | .12 | .13 | .25 | .25 | .13 | .13 | .37 | .13 | .38 |
| Temperatures, average: | | | | | | | | | |
|   Product outlet, °F | 127 | 128 | 132 | 138 | 127 | 128 | 131 | 137 | 143 |
|   Ash out, °F | 131 | 217 | 187 | 302 | 274 | 188 | 210 | 155 | 157 |
| Yields: | | | | | | | | | |
|   Oil actually recovered, gal./ton | 9.8 | 20.9 | 19.5 | 18.6 | 19.1 | 19.2 | 20.2 | 21.0 | 23.1 |
|   Oil actually recovered, vol. percent F. A. | 47.0 | 100.1 | 96.6 | 94.3 | 93.3 | 9.48 | 97.6 | 99.3 | 96.1 |
|   Gas vented, s. c. f./ton shale | 3,000 | 4,710 | 7,100 | 8,350 | 7,900 | 7,350 | 6,780 | 4,500 | 6,070 |
|   Ash, wt. percent raw shale | 87.0 | 82.5 | 77.1 | 77.7 | 77.4 | 80.7 | 83.6 | 86.9 | 80.1 |
|   Experimental wt. recovery, wt. percent | 93.5 | 97.1 | 95.2 | 96.0 | 97.0 | 100.5 | 100.3 | 100.7 | 99.6 |

[1] Velocity of gas corrected to standard conditions passing through empty retort.

Table 1 above gives a summary of the retorting conditions and yield data for runs 1 to 9, while Table 2 gives the product inspection data for these runs.

Table 2.—Gas combustion retorting data summary product inspections

| Run No | 1 | 2 | 3 | 4 | 5 | 6 | 7 | 8 | 9 |
|---|---|---|---|---|---|---|---|---|---|
| Product Oil: | | | | | | | | | |
|   Gravity, °A. P. I | 22.4 | 19.1 | 19.4 | 18.6 | 19.4 | 19.1 | 19.7 | 19.8 | 19.3 |
|   Specific gravity | 0.9194 | 0.9396 | 0.9377 | 0.9427 | 0.9377 | 0.9346 | 0.9358 | 0.9352 | 0.9383 |
|   Vis., S. U. S. at 130° F | 87.2 | 160.1 | 167.8 | 189.2 | 153.2 | 152.2 | 162.1 | 138.9 | 147.4 |
|   Vis., S. U. S. at 210° F | 42.2 | 50.0 | 51.6 | 52.2 | 50.3 | 56.0 | 51.8 | 47.1 | 50.7 |
|   Pour point, °F | 85 | 85 | 85 | 85 | 85 | 85 | 85 | 85 | 85 |
|   Flash point, °F | 235 | 220 | 270 | 265 | 235 | 245 | 230 | 260 | 270 |
|   Conradson carbon, wt. percent | 1.48 | 3.64 | 3.62 | 4.02 | 3.76 | 3.41 | 3.50 | 3.02 | 3.03 |
|   Water content, vol. percent | 3.6 | 11.0 | 3.0 | 4.8 | 5.8 | 5.0 | 2.5 | 1.6 | 2.3 |
| Distillation, A. S. T. M.— | | | | | | | | | |
|   I. B. P., °F | 334 | 336 | 263 | 354 | 344 | 344 | 352 | 354 | 373 |
|   2%, °F | 407 | 431 | 431 | 425 | 422 | 427 | 423 | 417 | 417 |
|   5%, °F | 452 | 438 | 472 | 480 | 450 | 466 | 466 | 456 | 434 |
|   10%, °F | 493 | 494 | 517 | 533 | 513 | 513 | 515 | 509 | 512 |
|   20%, °F | 557 | 580 | 590 | 602 | 589 | 585 | 580 | 582 | 612 |
|   30%, °F | 614 | 639 | 647 | 650 | 645 | 644 | 641 | 639 | 692 |
|   40%, °F | 659 | 679 | 682 | 687 | 683 | 679 | 680 | 679 | 769 |
|   50%, °F | 689 | | | | | | | | 833 |
|   E. P., °F | 699 | 699 | 699 | 699 | 699 | 699 | 699 | 699 | 900 |
|   Recovery, vol. percent | 59.0 | 53.0 | 51.0 | 49.0 | 52.0 | 51.0 | 54.0 | 53.0 | 61.7 |
| Product Gas: | | | | | | | | | |
|   Molecular wt | 27.5 | 28.3 | 28.4 | 28.0 | 28.5 | 28.7 | 27.9 | 27.8 | |
|   Heating value, B. t. u./s. c. f | 44.5 | 58.2 | 52.3 | 28.2 | 40.4 | 77.6 | 51.7 | 66.6 | 83 |
|   Composition— | | | | | | | | | |
|     CO₂, mol. percent | 13.4 | 19.0 | 21.3 | 18.7 | 19.2 | 26.7 | 20.8 | 18.6 | 27.9 |
|     Illuminants, mol. percent | 0.4 | 0.7 | 0.8 | 0.2 | 0.0 | 0.4 | 0.1 | 0.7 | 1.0 |
|     O₂, mol. percent | 0.0 | 0.0 | 0.0 | 0.0 | 0.0 | 0.0 | 0.0 | 0.0 | 0.0 |
|     CO, mol. percent | 2.1 | 2.2 | 2.8 | 2.1 | 3.2 | 1.6 | 3.1 | 3.4 | 5.3 |
|     H₂, mol. percent | 3.3 | 3.3 | 3.5 | 2.3 | 2.9 | 5.4 | 4.5 | 3.1 | 3.9 |
|     HC, mol. percent | 1.2 | 1.7 | 1.2 | 1.1 | 1.3 | 3.5 | 2.6 | 2.0 | 2.3 |
|     N₂, mol. percent | 62.6 | 55.6 | 50.8 | 52.6 | 56.4 | 45.4 | 49.9 | 50.2 | 47.7 |
|   Water vapor | 17.0 | 17.5 | 19.6 | 23.0 | 17.0 | 17.0 | 19.0 | 22.0 | 12.6 |
| Ash: | | | | | | | | | |
|   Oil content, gal./ton | 6.7 | 0.7 | 0.5 | 0.0 | 0.0 | 0.2 | 0.2 | 0.8 | 0.3 |
|   Organic residue content, wt. percent | 4.76 | 2.52 | 2.28 | 1.21 | 1.21 | 1.42 | 1.63 | 2.17 | 2.35 |
|   Mineral CO₂, wt. percent | 15.24 | 14.48 | 12.98 | 9.62 | 10.53 | 11.79 | 13.41 | 14.58 | 16.54 |
|   Ignition loss, wt. percent | 20.8 | 16.8 | 15.2 | 10.2 | 11.4 | 13.3 | 15.3 | 17.6 | |

The first eight of these runs were of relatively short duration (from 20 to 36 hours) and were conducted chiefly to show the effect of the process variables on the performance of the retorting operation. The process conditions chosen in these eight runs, therefore, were not necessarily ideal in all cases. Notwithstanding this fact, the shale throughput, and the yield of oil were exceptionally good in most of these runs, particularly as compared to the usual throughput and oil yield for prior internal combustion-type retorting processes.

The effect of two of the more important process variables, namely the superficial gas velocity in the retort, and the ratio of recycle gas to air is given in Figs. 2 and 3, respectively. In Fig. 2, the superficial gas velocity in the upper portion of the retort (in the solids preheating and products cooling zone) is plotted against the oil yield, the gas yield, the retorting rate, and the pressure drop through the bed respectively, at a constant recycle gas to air ratio of 4.3. As can be seen, as the gas velocity increases, both the retorting rate and the oil yield increase, while the yield of gas decreases. As would be expected, the pressure drop per feet of bed height increases with increasing gas velocity in the retort, and this factor is one of the limitations on the upper limit of the gas velocity in the retort.

In Fig. 3 the effect of varying the recycle gas:air ratio at a constant gas velocity of 0.58 ft./sec. (as measured in the upper portion of the retort) on oil yield, product gas yield, and retorting rate is given. The recycle gas:air ratio is defined as the ratio of the volume of recycle gas at standard conditions introduced into the bottom of the retort to the volume of air at standard conditions introduced into the mixing channel (tube 11).

As can be seen, the oil recovery efficiency improved as the recycle gas to air ratio was increased from about 4 to 7. At gas to air ratios greater than 8, the oil yields decreased sharply. Both the product gas yield and the retorting rate decreased as the recycle gas to air ratio was increased.

In run 9, the operating conditions were selected so that the process would give a relatively high performance particularly with respect to shale throughput and percentage recovery of liquid products. Run 9 was operated continuously for a period of over 9 days during which time the operating conditions were maintained relatively constant at the values indicated in Table 1.

During this run, approximately 6 tons of shale per day, or a total feed of about 56 tons, was charged to the retort. The retorting rate (shale throughput per unit time per unit of cross-section retort area) was 230 lbs. of shale per hour per square foot of bed area, which is a very high rate for an internal combustion-type retort. As previously mentioned, retorting rate is an important factor since it affects unit plant capacity directly, and therefore has a direct bearing on both plant investment and operating costs.

Reference is now made to Fig. 4 which shows a bed-temperature profile representative of temperature conditions in the retort during run 9. In this figure, the temperature of the shale bed is plotted against the height of the bed. To the left of the graph a diagrammatic representation of the retort is shown which corresponds in scale to the scale for bed height given on the vertical axis of the graph. The shape of this temperature curve is indicative of the high thermal efficiency of the process. As can be seen, the shale bed enters and leaves the retort at a low temperature, while the product stream likewise leaves the retort at almost room temperature.

As a result of the highly efficient heat recovery, an exceptionally small amount of heat as compared to prior internally-fired retorting processes is required to retort a ton of shale, as indicated by the heat balance for run 9 in Table 3 below. This heat balance is based on one ton of shale feed with the datum temperature taken as 60° F.

Table 3

| | B. t. u. | Percent |
|---|---|---|
| Heat input: | | |
| Heat of combustion | 368,800 | 94.5 |
| Sensible heat— | | |
| Air in | 2,220 | 4.9 |
| Recycle gas in | 19,080 | 0.6 |
| Total | 390,100 | 100.0 |
| Heat absorbed: | | |
| Sensible heat— | | |
| Oil (143° F.) | 6,300 | 1.6 |
| Gas (143° F.) | 41,770 | 10.7 |
| Retorted shale (157° F.) | 33,700 | 8.6 |
| Vaporization of water | 56,230 | 14.4 |
| Radiation and convection | 60,000 | 15.4 |
| Mineral carbonate decomposition | 143,000 | 36.7 |
| Total accounted for | 341,000 | 87.4 |
| Heat of eduction (by difference) | 49,100 | 12.6 |
| Total | 390,100 | 100.0 |

It will be noted that only about 20% of the heat is carried out of the process as sensible heat in the shale residue and in the product stream.

In addition to the highly efficient heat recovery, another reason for the low heat requirements of the process is that only one third of the mineral carbonates present in the shale are decomposed. Suppression of the mineral carbonate decomposition results from the relatively low and very uniform temperature prevailing throughout the combustion zone. Thus, while the heat absorbed by carbonate decomposition is by far the largest single heat requirement in the process, in prior retorting processes involving combustion within the retort, the maximum temperature in the combustion zone usually reaches a much higher level, leading to the decomposition of the major portion of the mineral carbonates in the shale and as a consequence these processes operate with much higher heat losses from this source.

During the entire period of operation, no trouble was encountered in maintaining substantially the same bed-temperature profile; the combustion zone remained in a fixed location within the retort (in the vicinity of the upper portion of the mixing tube) and consequently the effective bed height above and below the combustion zone remained the same. Likewise, no difficulty was encountered in maintaining the combustion zone temperature constant at approximately 1400° F. As the result of the constancy of these factors, the temperature of the outgoing residue shale and of the outgoing product stream likewise remained constant thereby insuring continuous operation at a high level of thermal efficiency.

As can be seen by reference to Table 1, the production of liquid product amounted to 98.8 volume percent of the feed assay. Of this, 96.1 volume percent of assay (98.3 weight percent of assay) was actually recovered. The difference between the weight and volume yield figures results from the fact that Fischer Assay oil has an A. P. I. gravity 3° to 4° higher than the retort oil.

The net product gas yield (retort gas over and above that returned to the retort as recycle gas) amounted to 5,305 cu. ft./ton of feed on a dry basis. The product gas had a water vapor content of about 13%, and gas product on a wet basis was 6,070 cu ft./ton of feed. This wet gas contained approximately 12% combustibles and had a gross heating value of about 80 B. t. u. per standard cu. ft. Although this gas is lean it burns readily when preheated. This net product gas, if burned, would supply almost 500,000 B. t. u. per ton of shale feed and can be used for power generation or process heat in much the same manner as the steel industry utilizes blast furnace gas which has about the same heating value.

The ideal operating conditions for the process of the invention will of course vary somewhat depending upon the character of the hydrocarbonaceous material, the construction of the retort, and various other factors. In the foregoing examples, typical operating conditions have been described in the application of the process to retorting oil shale in a retort similar to that shown in Fig. 1. Several correlations showing the effect of some of the process variables on the operation have been made. It is to be understood however, that these typical conditions have been given by way of illustration, and that wide variation in the process conditions is possible within the scope of the invention.

Reference is now made to Fig. 5 of the drawings which shows a second embodiment of a retort suitable for carrying out the process of the invention. This retort is generally similar to that shown in Fig. 1, consisting of an upright cylindrical vessel generally indicated by the reference numeral 30. The vessel proper consists of a metal shell 31 surrounded by an outside layer of insulation 32. The upper portion of the retort is equipped with a refractory lining 33. A charging mechanism 34 is provided at the top of the retort similar to that shown in Fig. 1. A residue discharging mechanism similar to that shown in Fig. 1, consisting of a turntable 35, equipped with drag chains 36, and driven by a variable speed motor 37 through a gear box 38 is provided at the bottom of the retort.

At the top of the retort, a discharge line 39 is provided for withdrawing the product stream, including distillation and combustion products, from the retort. Line 39 is connected to a product recovery and gas handling system which may be similar to that shown in Fig. 1. At the bottom of the retort, line 40 is provided for the introduction of recycle gases.

At an intermediate level in the retort a gas-mixing device including a cylindrical shell 41 is provided forming conjointly with the retort walls an annular channel 41a, open at top and bottom. The shell 41 is supported within the retort by braces 42 extending radially from the retort walls. A second cylindrical shell 43 of somewhat greater diameter than shell 41 is disposed concentrically with respect to shell 41 thereby providing an annular chamber 44 between shells 41 and 43. Shells 41 and 43 are connected at their upper extremities by an inwardly sloping plate 45 which serves to deflect downwardly flowing solid material towards the center of the retort. Refractory lining 33 overhangs channel 41a at 33a, thereby preventing solid material flowing downwardly through the retort from entering the channel. A number of conduits 46 are provided for introducing oxygen-containing gases into the annular chamber 44.

The operation of the retort shown in Fig. 5 is similar to the operation of that shown in Fig. 1 and therefore need not be described in detail. The shale flows downwardly through the retort as a bed of freely moving particles successively through a solids-preheating-and-products-cooling zone, a distillation zone, a combustion zone, and a residue cooling zone. Because of the overhanging refractory lining 33 and the inwardly sloping deflector plate 45, the downwardly moving solids to do enter the annular channel 41a between the cylindrical shell 41 and the walls of the retort thus leaving a channel free of solids immediately adjacent to the descending column of solids.

Cool recycle gases enter at line 40 and flow upwardly through the residue descending through the residue cooling zone thereby cooling the residue and at the same time becoming heated themselves. A portion of the preheated recycle gases becomes disengaged from the column of solids as these gases reach the bottom of shell 41. The disengaged gases then flow upwardly through the annular channel 41a between the shell 41 and the walls of the retort.

An oxygen-containing gas, preferably air, is introduced through lines 46 and passes first into the annular chamber 44. Since the inner shell 41 is in contact with the hot solids descending from the combustion zone directly above, the air in the annular chamber 44 becomes preheated and at the same time tends to cool the inner shell 41.

As may be seen in the drawing, shell 43 terminates above the lower extremity of shell 41 thereby allowing the air from chamber 44 to mix with the disengaged preheated recycle gases within channel 41a. This mixture of air and preheated recycle gases rises through the upper portion of the annular channel 41a and then flows from the upper extremity of this channel into the downwardly flowing column of solids.

As in the case of the retort shown in Fig. 1, actual combustion of the mixture may take place chiefly within the column of solids, or partly within the mixing channel and partly in the column of solids, depending chiefly upon the gas velocity through the channel. If the gas velocity within the channel is low enough, combustion may be initiated within the channel and may even take place therein to a substantial extent. In either case however, as in the embodiment shown in Fig. 1, combustion takes place chiefly in the vicinity of the upper extremity of the channel and the heat evolved is distributed rapidly and uniformly throughout the cross-section of the retort at this level.

The embodiment shown in Fig. 5 and described above differs from that shown in Fig. 1 in that the vertical, solids-free channel which serves for disengaging preheated recycle gases from the column of solids and for mixing these gases with air or other oxygen-containing gas, is located at the periphery of the retort instead of being disposed directly within the column of solids. While the arrangement shown in Fig. 5 will give very satisfactory results, the embodiment shown in Fig. 1, or any embodiment where the solids-free channel is virtually entirely surrounded by the downwardly moving column of solids, is to be preferred. A peripheral channel, used alone, is suitable only for retorts of relatively small cross-sectional area. In a retort of large cross-section, the gas mixture flowing from the top of the channel at the periphery of the retort would not be distributed to the center of the retort, resulting in uneven retorting. It is of course possible to combine a peripheral channel with a channel disposed virtually entirely within the column of solids. Likewise it is possible to employ a plurality of gas mixing devices forming a plurality of channels in the bed of downwardly moving solids. Such an arrangement, which is desirable for retorts of large cross-sectional area, is shown in Figs. 6 and 7 of the drawings.

Referring now to Fig. 6 the retort shown in this figure is rectangular in cross-section and insulated with a suitable refractory lining (not shown). At the top of the retort, a suitable charging mechanism (not shown) is provided for continuously introducing solid material into the retort through charging opening 50. An outlet 51 is provided near the top of the retort for withdrawing the product stream therefrom.

At the bottom of the retort, a discharging mechanism, consisting of a pair of rollers 52 turning in opposite directions, as shown in the drawing, is provided. Deflector plates 53 funnel the solid residue toward the opening between rollers 52. Depending upon the speed of rotation of the rollers 52 and upon the size of the opening between them, the rate of discharge of the solid residue from the retort may be controlled at will.

Below the residue discharging mechanism, an inlet 54 is provided for admitting recycle gases into the bottom portion of the retort. The recycle gases enter the retort proper chiefly through the opening between the rollers 52. A suitable gas seal (not shown) permits the solid residue to be discharged from the bottom of the vessel, after it passes through rollers 52 at a controlled rate, while preventing the escape of the recycle gases entering through inlet 54.

At an intermediate level in the retort, a number of gas mixing devices are provided, designated generally by the reference numeral 55. These gas mixing devices are similar in principle to those described in connection with the retorts shown in Figs. 1 and 5, serving to disengage gases flowing upwardly through the bottom portion of the retort, to mix the disengaged gases with additional gas introduced from a point outside the retort, and to pass the mixture back into the column of solid material at a higher level. As may be seen, each device extends across the width of the retort and is supported therein by end portions 80. The devices are spaced laterally from one another so as to permit the solid material in the retort to flow downwardly between them without hindrance.

For a more detailed illustration of one of the gas mixing devices 55, reference is now made to Fig. 7 of the drawings which shows an isometric view of the one of these devices partly in section. As may be seen, the device comprises a pair of parallel side walls 56 enclosing between them an open-ended vertical channel 56a.

Above the open upper end of the channel, a deflector 57 of triangular cross-section is provided. The base of the deflector 57 overhangs the side walls 56 of the channel thereby effectively preventing solid material from entering the channel. As may be seen, the deflector 57 is of hollow construction and likewise serves as a conduit. Upright extensions 58 of side walls 56 support deflector 57 above the upper open end of the channel 56a.

Within the channel, a pair of baffle plates 59 are disposed. Each of the baffle plates 59 forms a chamber 60 between itself and a side wall 56. The chambers 60 extend downwardly of the channel, terminating at an intermediate level therein, the lower extremity of the baffle plates 59 being bent towards the side walls 56 and fastened thereto by welding or other suitable means as at 61. Perforations 64 disposed at regular intervals along the lower extremity of the baffle plates 59 provide communication between the chamber 60 and the channel 56a for the transmission of a fluid stream from the chamber 60 into the channel. Sloping plates 62 seal the top of chambers 60. Thus, the only communication between channel 56a and chambers 60 is by way of perforations 64. Communication between chambers 60 and the triangular conduit 57 is provided by means of a rectangular conduit 63. Bottom plate 65 seals off communication between conduit 63 and channel 56a. Upper and lower baffles 66 and 67, respectively, disposed at regular intervals in the conduit formed by deflector 57, cause turbulent flow of the gas stream flowing therein.

Lines 68 provided at either end of triangular conduit 57 serve for the introduction of a fluid stream into either end of this conduit. Headers 69 on either side of the retort (see Fig. 6) connect with each of the conduits 68 in each of the gas mixing devices.

In the operation of this retort, the column of solids flows downwardly between the devices 55 in a substantially uninterrupted column. The lateral spacing between the devices 55 must be so adjusted, of course, that there is no bridging of the solid particles between pairs of these devices or between these devices and the walls of the retort.

A portion of the recycle gases flowing upwardly through the column of shale in the lower portion of the retort becomes disengaged from the column of solids by following the path of lesser resistance provided by the rectangular channel 56a in each of the gas mixing devices. Air or other oxygen-containing gas is introduced into the headers 69 and flows, by way of conduits 68, into the triangular conduit 57 in each gas mixing device and thence through the conduit 63 into chambers 60, and is distributed along the length of the channel 56a through perforations 64. The mixture of air and disengaged recycle gases flows out of the upper end of the channel 56a in each gas mixing device, and is deflected laterally into the column of downwardly moving solids by the under portion of deflector 57.

The cool gas introduced through headers 69 tends to cool the deflector 57 and to cool the upper portion of walls 56 during its passage through the chamber 60. At the same time, of course, this gas itself becomes preheated.

By the use of a plurality of gas mixing devices in the manner set forth, uniform distribution of the mixture of retorting gases throughout a retort of large cross-sectional area may be achieved. The number of, and spacing of, the gas mixing devices which will yield a maximum efficiency depends upon a large number of factors and is best determined empirically for any given set of conditions.

While the retorting method described is applicable in general to the destructive distillation of solid hydrocarbonaceous materials, including oil shale, coal, lignite, peat, wood, etc., it is particularly adapted for the destructive distillation of oil shale. The term oil shale, as employed in the specification and claims, is intended to refer to sedimentary rocks containing an organic material, usually termed kerogen, which upon heating yields a mixture of hydrocarbons and organic nitrogen, oxygen, and sulfur compounds, usually termed "shale oil." Extensive deposits of oil shale are found in this country, particularly in Colorado, Utah, and Wyoming, of which the deposits found in the so-called Green River shale formation are typical. The invention has been found to be particularly applicable to the type of shale found in this country.

It is to be understood that the above description, together with the specific examples and embodiments described, is intended merely to illustrate the invention, and that the invention is not to be limited thereto, nor in any way except by the scope of the appended claims.

We claim:
1. A method for the destructive distillation of solid hydrocarbonaceous materials comprising the steps of passing the material in particulate form downwardly as a continuous vertical column of solid material successively through a distillation zone, a combustion zone, and a residue cooling zone, withdrawing from above said distillation zone the products of combustion and of distillation, including a noncondensible gas relatively lean in combustibles, recycling at least a portion of said lean gas in a relatively cool condition to the lower portion of said residue cooling zone, permitting said recycled gas to pass upwardly through said column in contact with the hot residue from said combustion zone whereby said residue becomes cooled and said gas becomes heated, disengaging from said column at least a portion of the hot lean gas flowing upwardly through said residue cooling zone, passing said disengaged gas through a vertical solids-free channel, said channel being completely surrounded by the vertical column of the continuous particulate material and being shielded therefrom at its upper end, mixing an oxygen-containing gas with said disengaged lean gas within said channel and passing the resultant mixture into said column above said residue cooling zone, thereby establishing a zone of combustion in the column of shale between said residue cooling zone and said distillation zone, and permitting the hot gases from said combustion zone to pass upwardly through said column thereby effecting distillation of the downwardly moving material.

2. A method in accordance with claim 1 in which the solid hydrocarbonaceous material comprises oil shale.

3. A method for the destructive distillation of solid hydrocarbonaceous materials comprising the steps of passing the material in particulate form downwardly as a vertical column of solid material successively through a preheating zone, a distillation zone, a combustion zone, and a residue cooling zone, withdrawing from above said preheating zone in a relatively cool condition the products of combustion and of distillation including normally liquid products together with a noncondensible gas relatively lean in combustibles, separating said liquid products from said lean noncondensible gas, recycling at least a portion of said lean gas in a relatively cool condition to the lower portion of said residue cooling zone, permitting said recycled gas to pass upwardly through said column in contact with the hot residue from said combustion zone whereby said residue becomes cooled and said gas becomes heated, disengaging from said column at least a portion of the hot lean gas flowing upwardly through said residue cooling zone, passing said disengaged gas through a vertical solids-free channel, said channel being completely surrounded by the vertical column of continuous particulate material and being shielded therefrom at its upper end, mixing an oxygen-containing gas with said disengaged lean gas and passing the resulting mixture into the column above said residue cooling zone, thereby establishing a zone of combustion in the column of shale between said residue cooling zone and said distillation zone, and permitting the hot gases from said combustion zone to pass upwardly through said column thereby effecting distillation of the downwardly moving material.

4. A method in accordance with claim 3 in which the solid hydrocarbonaceous material comprises oil shale.

5. A method for the destructive distillation of solid hydrocarbonaceous materials comprising the steps of passing the material in particulate form downwardly as a vertical column of solid material successively through a distillation zone, a combustion zone, and a residue cooling zone, withdrawing from above said distillation zone the products of combustion and of distillation, including a noncondensible gas relatively lean in combustibles, recycling at least a portion of said lean gas in a relatively cool condition to the lower portion of said residue cooling zone, permitting the recycled gas to pass upwardly through said column in contact with the hot residue descending from said combustion zone whereby said residue becomes cooled and said gas becomes heated, maintaining at least one vertical, solids-free channel in the upper portion of said residue cooling zone, said channel being completely surrounded by the vertical column of continuous particulate material and being shielded therefrom at its upper end, and communicating at its upper and lower extremities with said column, whereby at least a portion of the hot lean gas flowing upwardly through said residue cooling zone becomes disengaged from said column, passes into the lower portion of said channel and rises therethrough, mixing an oxygen-containing gas with said disengaged gas as it passes upwardly through said channel, permitting the resulting mixture to flow from the upper portion of said channel into said downwardly flowing column of particulate material thereby establishing a zone of combustion in the vicinity of the upper extremity of said channel with combustion occurring within said column of material, and permitting the hot gases from said combustion zone to pass upwardly through said column thereby effecting distillation of the downwardly moving material.

6. A method in accordance with claim 5 in which the solid hydrocarbonaceous material comprises oil shale.

7. A method for the destructive distillation of solid hydrocarbonaceous materials comprising the steps of passing the material in particulate form downwardly as a vertical column of solid material successively through a distillation zone, a combustion zone, and a residue cooling zone, withdrawing from above said distillation zone the products of combustion and of distillation, including a noncondensible gas relatively lean in combustibles, recycling at least a portion of said lean gas in a relatively cool condition to the lower portion of said residue cooling zone, permitting the recycled gas to pass upwardly through said column in contact with the hot residue descending from said combustion zone whereby said residue becomes cooled and said gas becomes heated, maintaining at least one vertical, solids-free channel in the upper portion of said residue cooling zone, said channel being imbedded within and surrounded by the downwardly moving column of solids, and communicating at its upper and lower extremities with said column, whereby at least a portion of the hot lean gas flowing upwardly through said residue cooling zone becomes disengaged from said column, and passes into the lower portion of said channel, rising therethrough out of contact with said solid material, mixing an oxygen-containing gas with said disengaged gas as it passes upwardly through said channel, permitting the resulting mixture to flow from the upper portion of said channel into said downwardly flowing column of particulate material thereby establishing a zone of combustion in the vicinity of the upper extremity of said channel with combustion occurring within said column of material, and permitting the hot gases from said combustion zone to pass upwardly through said column thereby effecting distillation of the downwardly moving material.

8. A method in accordance with claim 7 in which the solid hydrocarbonaceous material comprises oil shale.

9. A method for the distillation of solid hydrocarbonaceous materials comprising the steps of passing the material in particulate form downwardly as a vertical column of said material successively through a distillation zone, a combustion zone, and a residue cooling zone, withdrawing from above said distillation zone the products of combustion and of distillation, including a noncondensible gas relatively lean in combustibles, recycling at least a portion of said lean gas in a relatively cool condition to the lower portion of said residue cooling zone, permitting the recycled gas to pass upwardly through said column in contact with the hot residue descending from said combustion zone whereby said residue becomes cooled and said gas becomes heated, maintaining a plurality of vertical solids-free channels in the upper portion of said residue cooling zone, said channels being spaced laterally from one another and imbedded within and surrounded by the downwardly moving column of solids, and each communicating at its upper and lower extremities with said column, whereby at least a portion of the hot lean gas flowing upwardly through said residue cooling zone becomes disengaged from said column and passes into a lower portion of said channels, rising therethrough out of contact with said solid material, mixing an oxygen-containing gas with said disengaged gas as it passes upwardly through said channels, permitting the resulting mixtures in said channels to flow from the upper portions thereof into said downwardly flowing column of particulate material thereby establishing a zone of combustion in the vicinity of the upper extremities of said channels with combustion occurring within said column of material, and permitting the hot gases from said combustion zone to pass upwardly through said column thereby effecting distillation of the downwardly moving material.

10. A method in accordance with claim 9 in which the solid hydrocarbonaceous material comprises oil shale.

11. A method for the destructive distillation of solid hydrocarbonaceous materials comprising the steps of passing the material in particulate form downwardly as a vertical column of solid material successively through a preheating zone, a distillation zone, a combustion zone, and a residue cooling zone, withdrawing from above said preheating zone in a relatively cool condition the products of combustion and of distillation including normally liquid products together with a noncondensible gas relatively lean in combustibles, separating said liquid products from said noncondensible gas, recycling at least a portion of said lean, noncondensible gas in a relatively cool condition to the lower portion of said residue cooling zone, permitting said recycled gas to pass upwardly through said column in contact with the hot residue descending from said combustion zone whereby said residue becomes cooled and said gas becomes heated, maintaining a plurality of vertical, solids-free channels in the upper portion of said residue cooling zone, said channels being spaced laterally from one another and imbedded within and surrounded by the downwardly moving column of solids, and each communicating at its upper and lower extremities with said column, whereby at least a portion of the hot lean gas flowing upwarly through said residue cooling zone becomes disengaged from said column, and passes into the lower portions of said channels, rising therethrough out of contact with said solid material, mixing an oxygen-containing gas with said disengaged gas as it passes upwardly through said channels, permitting the resulting mixtures to flow from the upper portions of said channels into said downwardly flowing column of particulate material thereby establishing a zone of combustion in the vicinity of the upper extremities of said channels with combustion occurring within said column of material, and permitting the hot gases from said combustion zone to pass upwardly through said column thereby effecting distillation of the downwardly moving material.

12. A method in accordance with claim 11 in which the solid hydrocarbonaceous material comprises oil shale.

References Cited in the file of this patent

UNITED STATES PATENTS

| | | |
|---|---|---|
| Re. 16,252 | Catlin | Jan. 12, 1926 |
| 1,524,784 | Bartolomeis | Feb. 3, 1925 |
| 1,592,467 | Rosenthal | July 13, 1926 |

(Other references on following page)

UNITED STATES PATENTS

| | | |
|---|---|---|
| 1,639,417 | Wallace | Aug. 16, 1927 |
| 1,690,933 | Hubman | Nov. 6, 1928 |
| 1,690,935 | Hubman | Nov. 6, 1928 |
| 1,822,383 | Snyder | Sept. 8, 1931 |
| 1,894,691 | Karrick | Jan. 17, 1933 |
| 1,917,196 | Perry | July 4, 1933 |
| 2,572,051 | Parry | Oct. 23, 1951 |
| 2,574,850 | Utterbach et al. | Nov. 13, 1951 |

OTHER REFERENCES

Annual Report of Secretary of the Interior for 1950, Synthetic Liquid Fuels, part II: Oil from Oil Shale, February 1951, pages 20–22, Figure 27.

Lowry: "Chemistry of Coal Utilization," vol. II, John Wiley & Sons, publishers, 1945; page 1665.